(12) United States Patent
Hsieh et al.

(10) Patent No.: US 9,897,749 B2
(45) Date of Patent: Feb. 20, 2018

(54) DISPLAY DEVICE AND BACKLIGHT MODULE THEREOF

(71) Applicant: AmTRAN TECHNOLOGY CO., LTD, New Taipei (TW)

(72) Inventors: Chih-Hung Hsieh, New Taipei (TW); Chih-Kuei Wang, New Taipei (TW); Chieh-Wen Cheng, New Taipei (TW)

(73) Assignee: AMTRAN TECHNOLOGY CO., LTD, New Taipei (TW)

( * ) Notice: Subject to any disclaimer, the term of this patent is extended or adjusted under 35 U.S.C. 154(b) by 118 days.

(21) Appl. No.: 14/743,569

(22) Filed: Jun. 18, 2015

(65) Prior Publication Data

US 2016/0306104 A1    Oct. 20, 2016

(30) Foreign Application Priority Data

Apr. 15, 2015 (TW) .............................. 104112133 A (51) Int. Cl.
  *G02F 1/1333* (2006.01)
  *F21V 8/00* (2006.01)

(52) U.S. Cl.
  CPC .......... *G02B 6/0088* (2013.01); *G02B 6/005* (2013.01); *G02B 6/009* (2013.01); *G02F 1/133308* (2013.01); *G02F 2001/133317* (2013.01)

(58) Field of Classification Search
  CPC ................................................ G02F 1/133308
  See application file for complete search history.

(56) References Cited

U.S. PATENT DOCUMENTS

| | | | |
|---|---|---|---|
| 2010/0277664 A1* | 11/2010 | Kim | G02B 6/0085 349/58 |
| 2013/0265526 A1* | 10/2013 | Park | G02B 6/0073 349/65 |
| 2015/0277179 A1* | 10/2015 | Nishi | G02B 6/0088 349/58 |
| 2016/0062523 A1* | 3/2016 | Jeong | G02F 1/133308 349/12 |
| 2016/0291231 A1* | 10/2016 | Jang | G02B 6/005 |

\* cited by examiner

*Primary Examiner* — Edmond Lau
(74) *Attorney, Agent, or Firm* — Muncy, Geissler, Olds & Lowe, P.C.

(57) ABSTRACT

A backlight module includes a back board, an illumination assembly, a supporting component and a frame. The illumination assembly is disposed on the back board. The supporting component includes a base, a first extending plate and a second extending plate. The base is disposed on the back board. Both of the first extending plate and the second extending plate stand on the base and extend along an axial direction of the base so that the first extending plate and the second extending plate are at a first angle and a second angle relative to the base, respectively. The first extending plate is located between the second extending plate and the illumination assembly. The frame is disposed on the supporting component, and the illumination assembly is located between the frame and the back board.

10 Claims, 8 Drawing Sheets

DISPLAY DEVICE AND BACKLIGHT MODULE THEREOF

CROSS-REFERENCE TO RELATED APPLICATIONS

This non-provisional application claims priority under 35 U.S.C. § 119(a) on Patent Application No(s). 104112133 filed in Taiwan, R.O.C. on Apr. 15, 2015, the entire contents of which are hereby incorporated by reference.

TECHNICAL FIELD

The disclosure relates to a backlight module and a display device, more particularly to a backlight module having a supporting component and a display device having the backlight module.

BACKGROUND

Liquid crystal displays (LCDs) have been widely applied to various electronic products. Since a display panel of the liquid crystal display is unable to emit light by itself, the liquid crystal display includes a backlight module for providing light to the display panel such that the display panel is able to display images. Generally, a conventional backlight module includes a back board, a light guide plate, a plurality of optical films, a frame and a light source. The light provided by the light source passes through the light guide plate and the optical films to evenly illuminate the display panel.

Generally, in order to fabricate elements of the backlight module, an edge of the back board has been subject to a prior punching process, so as to bend to a lateral wall or a barricade for fixing the optical films and the frame on the back board. However, with the trend of enlarging the screen size and thinning the thickness of an LCD, the structural strength at the edge of the conventional backlight module is usually insufficient, which results in the consequence that the LCD is easily deformed due to extruding or impact by external forces.

SUMMARY

According to one aspect of the disclosure, a backlight module comprises a back board, an illumination assembly, a supporting component and a frame. The illumination assembly is disposed on the back board. The supporting component comprises a base, a first extending plate and a second extending plate. The base is disposed on the back board. Both of the first extending plate and the second extending plate stand on the base and extend along an axial direction of the base so that the first extending plate and the second extending plate are at a first angle and a second angle relative to the base, respectively. The first extending plate is located between the second extending plate and the illumination assembly. The frame is disposed on the supporting component, and the illumination assembly is located between the frame and the back board.

According to another aspect of the disclosure, a display device comprises a display panel, a bezel and the aforementioned backlight module. The display panel is disposed on the frame of the backlight module and has an edge portion. The bezel is disposed on the backlight module. The bezel surrounds the backlight module, and the edge portion of the display panel is located between the frame and a part of the bezel.

According to the disclosed backlight module and display device, the base of the supporting component is disposed on the back board. The first and second extending plates both stand on the base and extend along the axial direction of the base. Through the structure design of making the first and second extending plates stand on the base, the supporting component is helpful to reinforce the structural strength at the edge of the backlight module, thereby preventing the display device from deformation due to external forces exerted.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
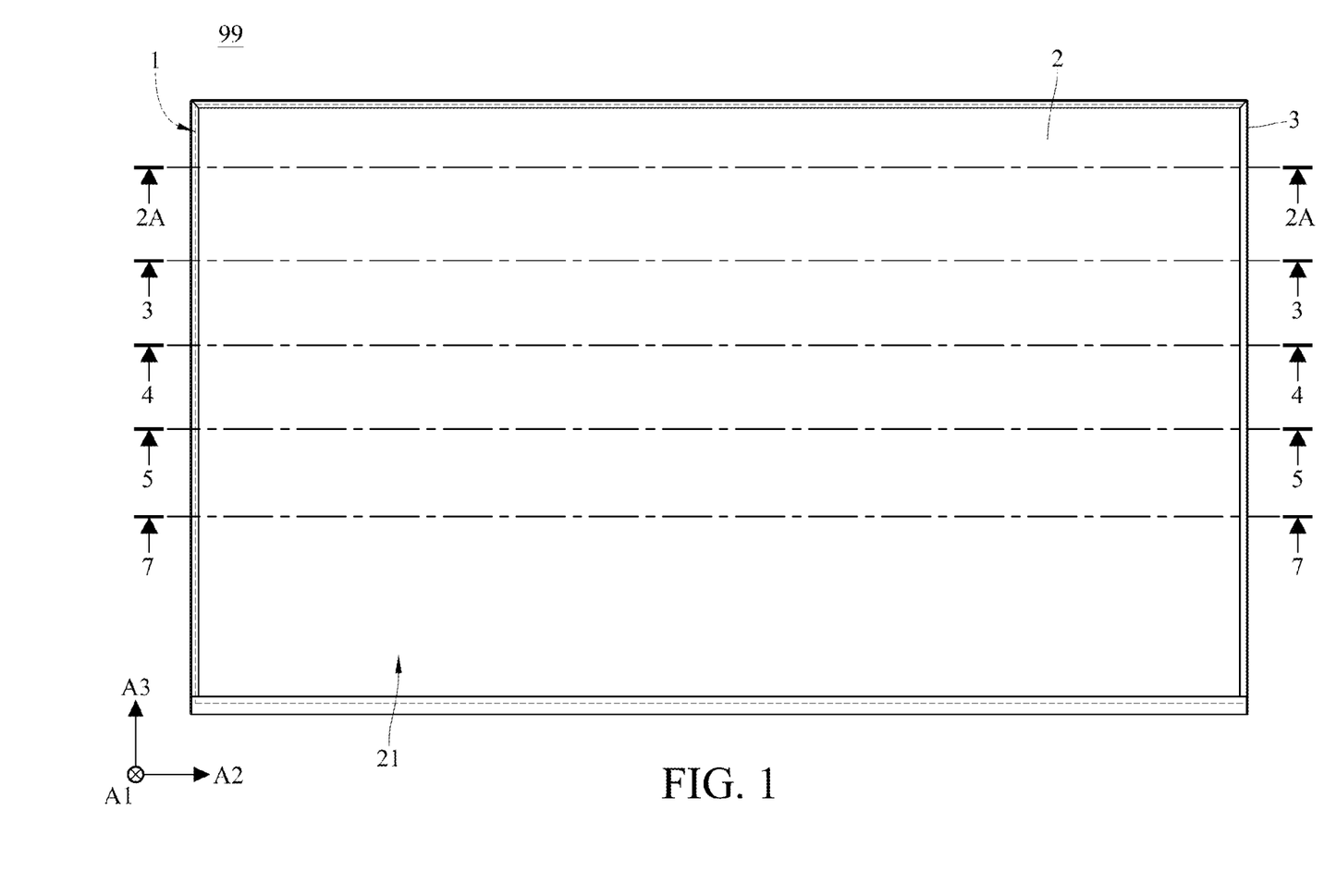
FIG. 1 is a front view of a display device according to an embodiment of the disclosure.
Figure 2A:
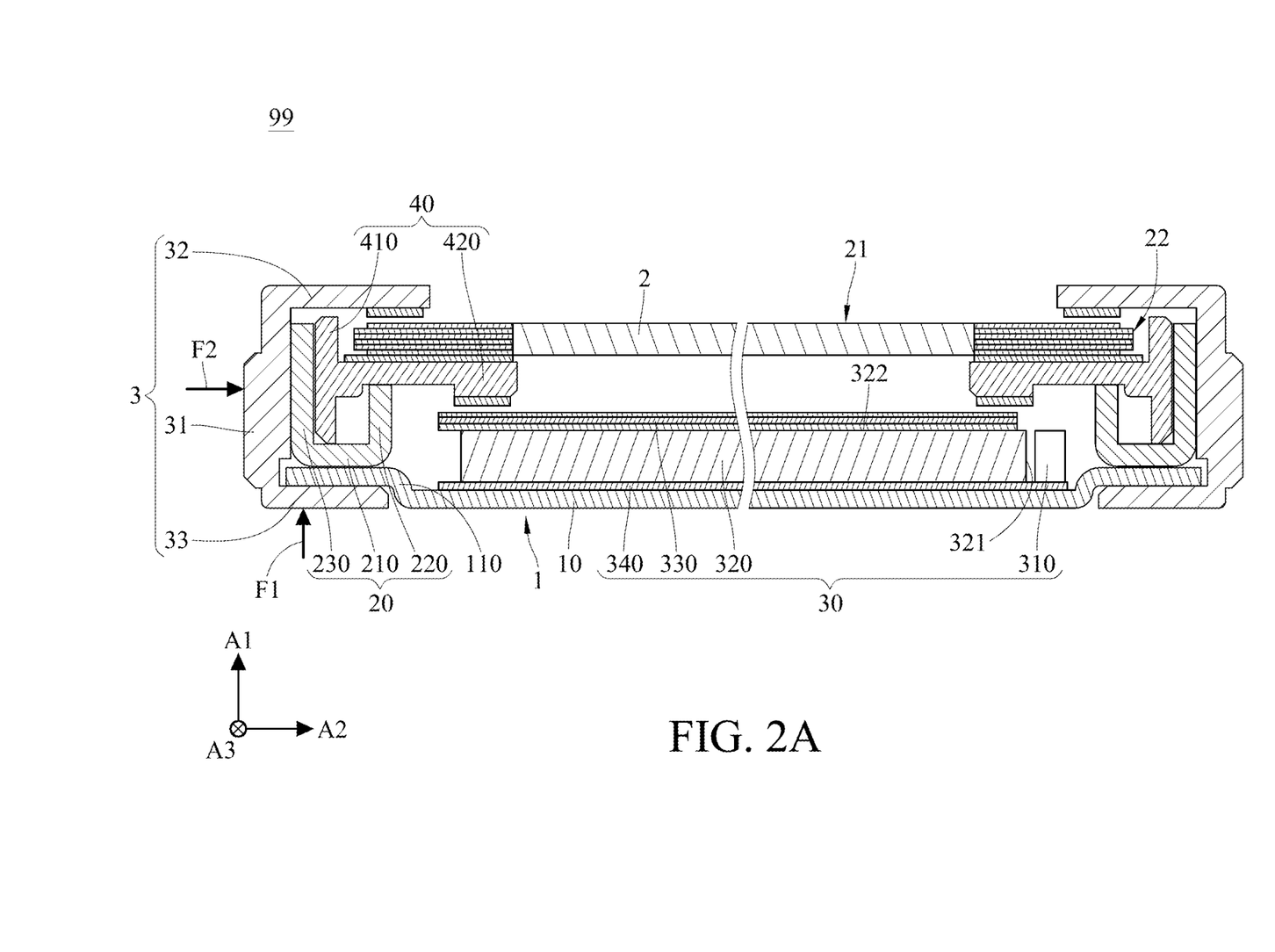
FIG. 2A is a cross-sectional view of the display device along a section line 2A-2A in FIG. 1.
Figure 2B:
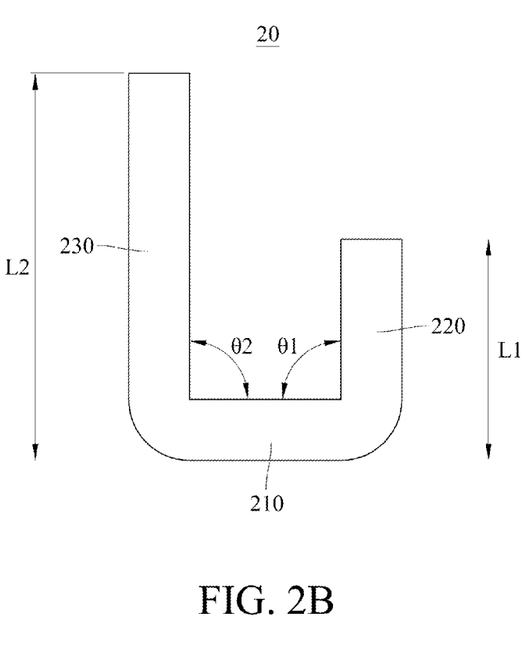
FIG. 2B is a side view of a supporting component in FIG. 2A.

Please refer to FIG. 1, FIG. 2A and FIG. 2B. FIG. 1 is a front view of a display device according to an embodiment of the disclosure. FIG. 2A is a cross-sectional view of the display device along a section line 2A-2A in FIG. 1. FIG. 2B is a side view of a supporting component in FIG. 2A. In this embodiment, a display device 99 comprises a backlight module 1, a display panel 2 and a bezel 3.

The backlight module 1 comprises a back board 10, a supporting component 20, an illumination assembly 30 and a frame 40.

The back board 10 is, for example, made of, but not limited to metal. The back board 10 comprises a bent portion 110.

The supporting component 20 is disposed on the back board 10. Specifically, every time the context in this specification mentions "A component is disposed on B component", such recitation refers to the meaning "A component and B component are stacked up in order as facing a light-exit surface 322 of the backlight module 1." or "A component and B component are piled up in order as facing a display surface 21 of the display device 99.". The material of the supporting component 20 is, for example, but not limited to metal or acrylic. In detail, the supporting component 20 comprises a base 210, a first extending plate 220 and a second extending plate 230. The base 210 is disposed on the bent portion 110 of the back board 10, namely the edge of the back board 10.

Particularly, the first extending plate 220 and the second extending plate 230 are set parallel to an axial direction A3 of the base 210. Taking FIG. 2A as an example, a first axial direction A1 is perpendicular to the display surface 21 of the display device 99 (or a light-exit surface 322 of the backlight module 1), and a second axial direction A2 is parallel to the display surface 21 (or the light-exit surface 322 of the backlight module 1) and perpendicular to either side of the display device 99. The first axial direction A1 and the second axial direction A2 are defined to be mutually perpendicular. In other words, within this embodiment, the axial direction A3 of the base 210 is perpendicular to both of the first axial direction A1 and the second axial direction A2. That is, the axial direction A3 of the base 210 is the direction out of or going into the paper of FIG. 2A. The first and second extending plates 220, 230 both extend from the base 210 along the first axial direction A1 (as shown in FIG. 2A).

In more detail, the first and second extending plates 220, 230 of this embodiment are normal to the base 210 so that they are respectively at a first angle $\theta_1$ of 90° and a second angle $\theta_2$ of 90° relative to the base 210. However, the disclosure is not limited thereto. In other embodiments, the first angle $\theta_1$ and the second angle $\theta_2$ can be acute angles or obtuse angles.

Moreover, in this embodiment, a length L1 of the first extending plate 220 is less than a length L2 of the second extending plate 230 so that it is favorable for assembling the backlight module 1 as well as considering structural strength. However, the disclosure is not limited to above. In other embodiments, the dimensional relationship between the first and second extending plates may be adjusted according to actual need. For example, the length L1 can be greater than the length L2. Alternatively, the length L1 can be equal to the length L2. In addition, the widths and thicknesses of the first and second extending plates 220, 230 can also be adjusted in terms of various designs, such as having their widths and thicknesses all different.

Furthermore, although the profiles of the disclosed first and second extending plates 220, 230 along the section line 2-2 are rectangles, other profile shapes, such as an arc strip profile, a triangular profile and etc., may apply well in different embodiments according to the disclosure.

The illumination assembly 30 is disposed on the back board 10. In detail, the illumination assembly 30 comprises a light source 310, a light guide plate 320, a plurality of optical films 330 and a reflection plate 340. The light guide plate 320 has the light-entrance surface 321 and the light-exit surface 322. The light source 310 is disposed near the light-entrance surface 321. The optical films 330 are stacked up on the light-exit surface 322. The reflection plate 340 is located on a side, away from the light-exit surface 322, of the light guide plate 320. The first extending plate 220 of the supporting component 20 is located between the second extending plate 230 and the light guide plate 320.

The frame 40 is, for example, made of, but not limited to high molecular polymers. The frame 40 is disposed on the supporting component 20. The illumination assembly 30 is located between the back board 10 and the frame 40. In detail, the frame 40 comprises a side wall 410 and a bearing part 420. The bearing part 420 extends from an edge of the side wall 410. The side wall 410 is located between the first extending plate 220 and the second extending plate 230 of the supporting component 20. The bearing part 420 is disposed on the first extending plate 220. The light guide plate 320 and the optical films 330 are located between the bearing part 420 and the back board 10.

The display panel 2 is, for example, a liquid crystal panel disposed on the frame 40 of the backlight module 1. In detail, the display panel 2 is loaded on a side, far away from the illumination assembly 30, of the bearing part 420.

The bezel 3 is, for example, made of, but not limited to metal. The bezel 3 is disposed on the circumference of the backlight module 1, and an edge portion 22 of the display panel 2 is located between the frame 40 and a part of the bezel 3. In detail, the bezel 3 comprises a lateral segment 31, a top segment 32 and a bottom segment 33. The top segment 32 and the bottom segment 33 are connected to two opposing sides of the lateral segment 31, respectively. The second extending plate 230 of the supporting component 20 is located between the first extending plate 220 and the lateral segment 31. The edge portion 22 of the display panel 2 is located between the bearing part 420 of the frame 40 and the top segment 32. The bottom segment 33 is disposed on a side, far away from the supporting component 20, of the bent portion 110 of the back board 10 so that an exposed exterior of the bottom segment 33 is roughly aligned with an exposed exterior of the back board 10. Furthermore, the top segment 32 and the bottom segment 33 both extend from the lateral segment 31 along the second axial direction A2. That is, a first extending direction (the axial direction A1) of the first and second extending plates 220, 230 is perpendicular to a second extending direction (the axial direction A2) of the top segment 32 and the bottom segment 33.

To summarize the above, the base 210 of the supporting component 20 is disposed on the back board 1. The first and second extending plates 220, 230 both line on the base 210 along the axial direction A3 of the base 210. Through such arrangement, as shown in FIG. 2A, the structure design of the supporting component 20 is capable of effectively withstanding external forces exerted on the back board 10, such as an external force F1 that is parallel to the normal of the back board 10. Therefore, the structure design is helpful to reinforce the structural strength at the edge portion of the backlight module 1, which then avoids deformation of the display device 99. Furthermore, the bezel 3 may further resist external forces exerted on the display devices 99, additionally enhancing the structural strength at the edge of the display device 99. Since the extending direction (the second axial direction A2) of the top segment 32 and the bottom segment 33 is orthogonal to the extending direction (the first axial direction A1) of the first and second extending plates 220, 230, the bezel 3 is enabled to withstand an external force F2 that is perpendicular to the normal of the back board 10. Hence, the configuration of the supporting component 20 and the bezel 3 equip the display device 99 with the capability for withstanding external forces along multiple axes, thereby improving overall structural strength of the display device 99.

Figure 3:
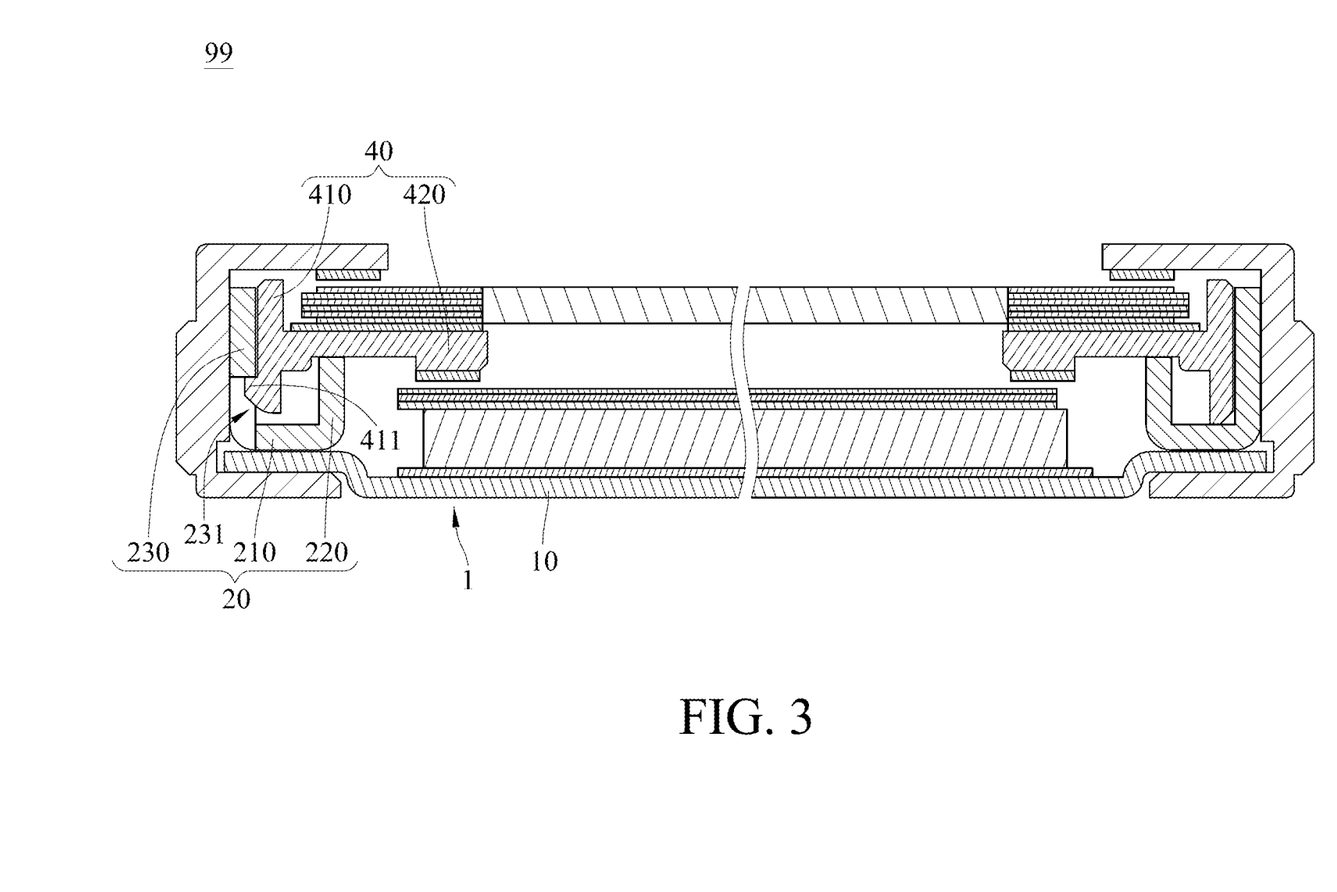
FIG. 3 is a cross-sectional view of the display device along a section line 3-3 in FIG. 1.

Please refer to FIG. 3, which is a cross-sectional view of the display device along a section line 3-3 in FIG. 1. In this embodiment, the second extending plate 230 of the supporting component 20 may additionally have a fastening hole 231, and the side wall 410 of the frame 40 may have a hook 411 corresponding the fastening hole 231. The hook 411 is engaged with the fastening hole 231 so as to fix the frame 40 to the supporting component 20. By this embodiment, positioning between the frame 40 and the supporting component 20 is facilitated.

Figure 4:
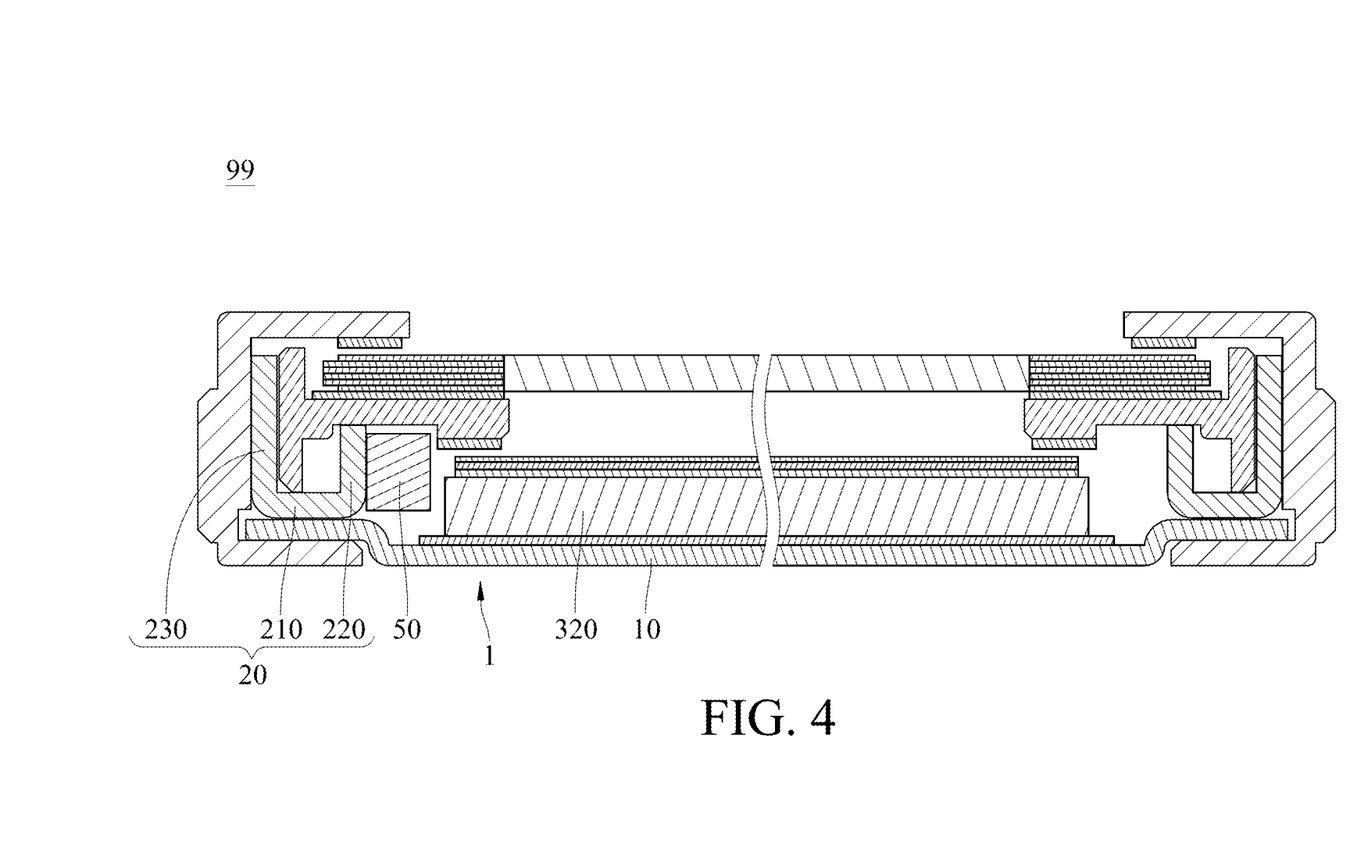
FIG. 4 is a cross-sectional view of the display device along a section line 4-4 in FIG. 1.

Please refer to FIG. 4, which is a cross-sectional view of the display device along a section line 4-4 in FIG. 1. In this embodiment, the backlight module 1 may further comprise a positioning member 50. The first extending plate 220 of the supporting component 20 withstands against the positioning member 50. The positioning member 50 is located between the first extending plate 220 and the light guide plate 320. That is, the first extending plate 220 and the light guide plate 320 are located at two opposing sides of the positioning member 50. Therefore, a distance between the first extending plate 220 and the light guide plate 320 can be properly kept.

Figure 5:
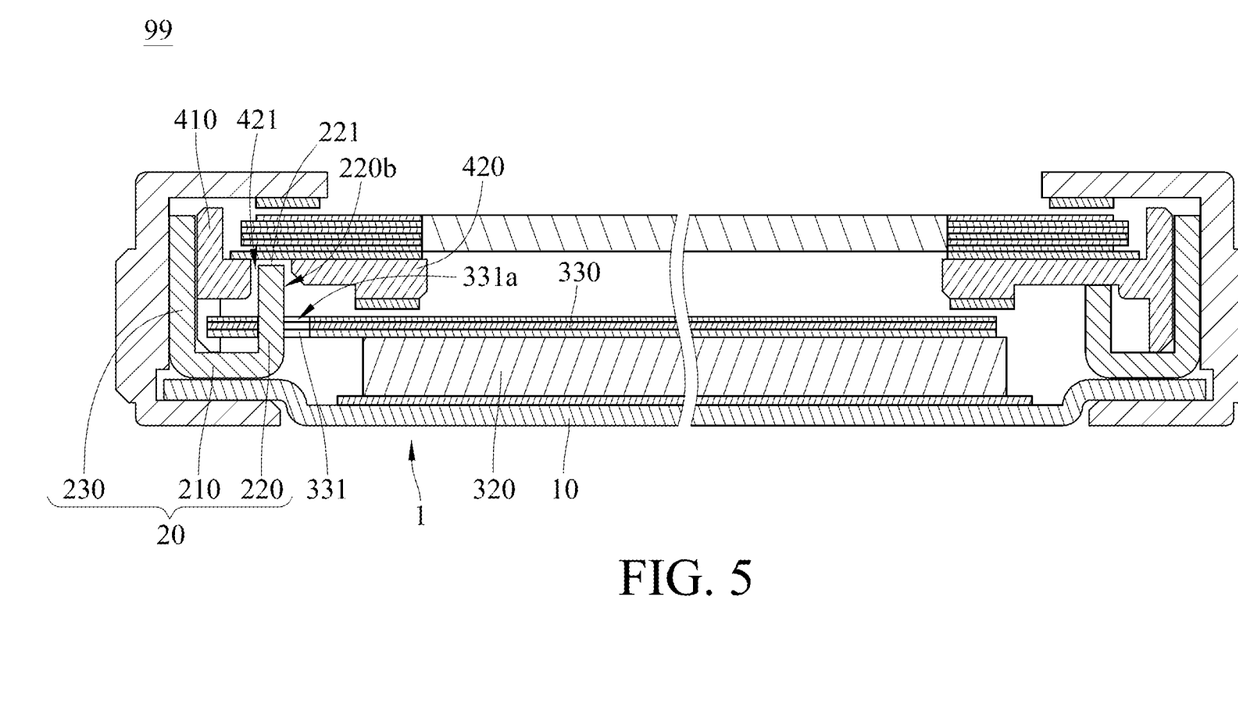
FIG. 5 is a cross-sectional view of the display device along a section line 5-5 in FIG. 1.
Figure 6:
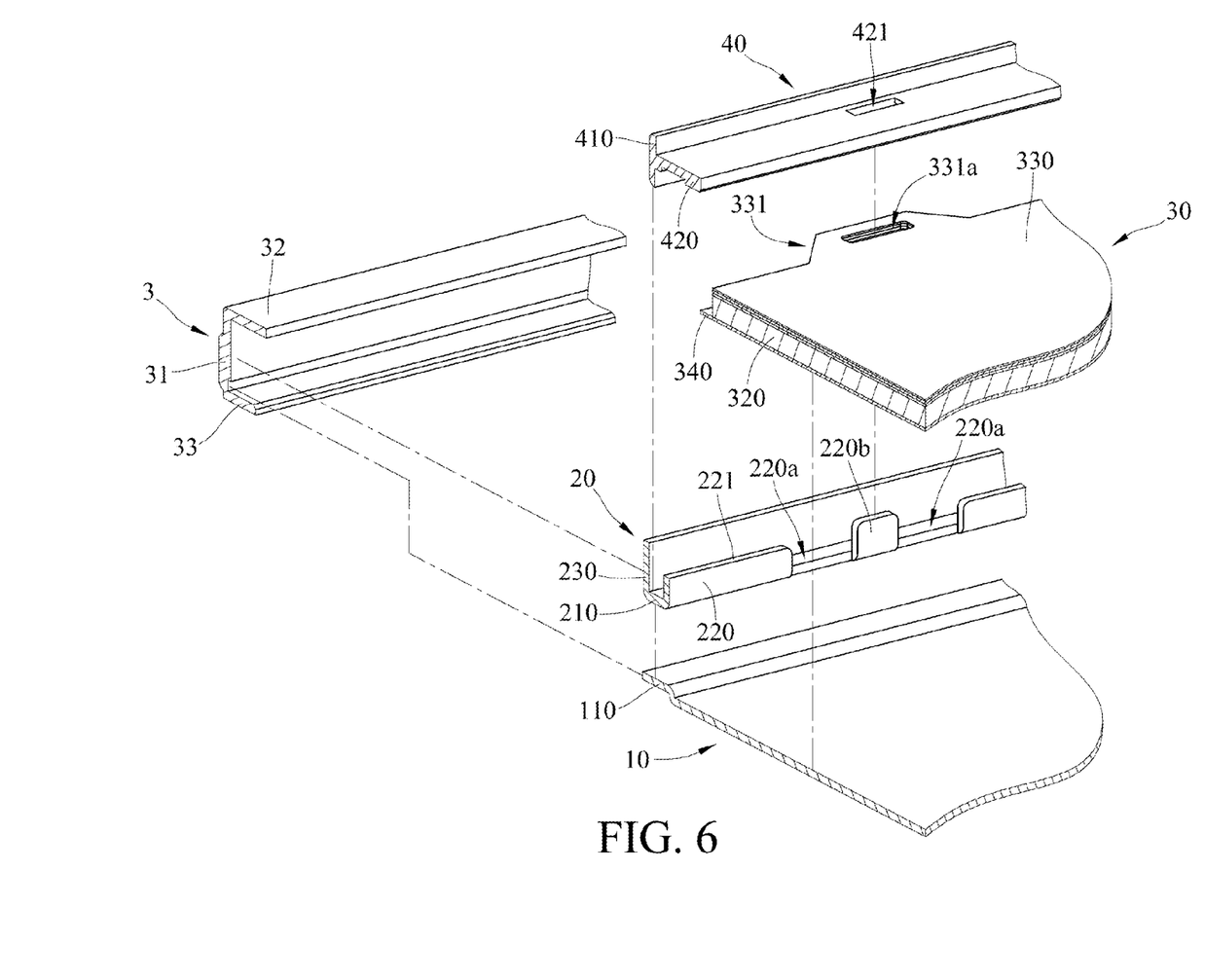
FIG. 6 is an exploded view of the supporting component and optical films within the display device of FIG. 5.

Please refer to FIG. 5 and FIG. 6. FIG. 5 is a cross-sectional view of the display device along a section line 5-5 in FIG. 1. FIG. 6 is an exploded view of the supporting component and optical films within the display device of FIG. 5. In this embodiment, a side of the first extending plate 220, far away from the base 210, may have a top surface 221. The first extending plate 220 may further be recessed from the top surface 221 to the base 210, so as to form two recesses 220a on the top surface 221 and a fixing portion 220b between the two recesses 220a. At least one of the optical films 330 can comprises a protrusion 331 protruding from the side neighboring with the first extending plate 220, and the protrusion 331 can have a fixing hole 331a. The bearing part 420 of the frame 40 can have an accommodation groove 421. A part of the fixing portion 220b is located in the accommodation groove 421. The protrusion 331 of the at least one optical film 330 is embedded into the two recesses 220a. The fixing portion 220b penetrates the fixing hole 331a so that said optical film 330 is fixed to the back board 10, thereby augmenting positioning between the optical films 330 and the back board 10.

Figure 7:
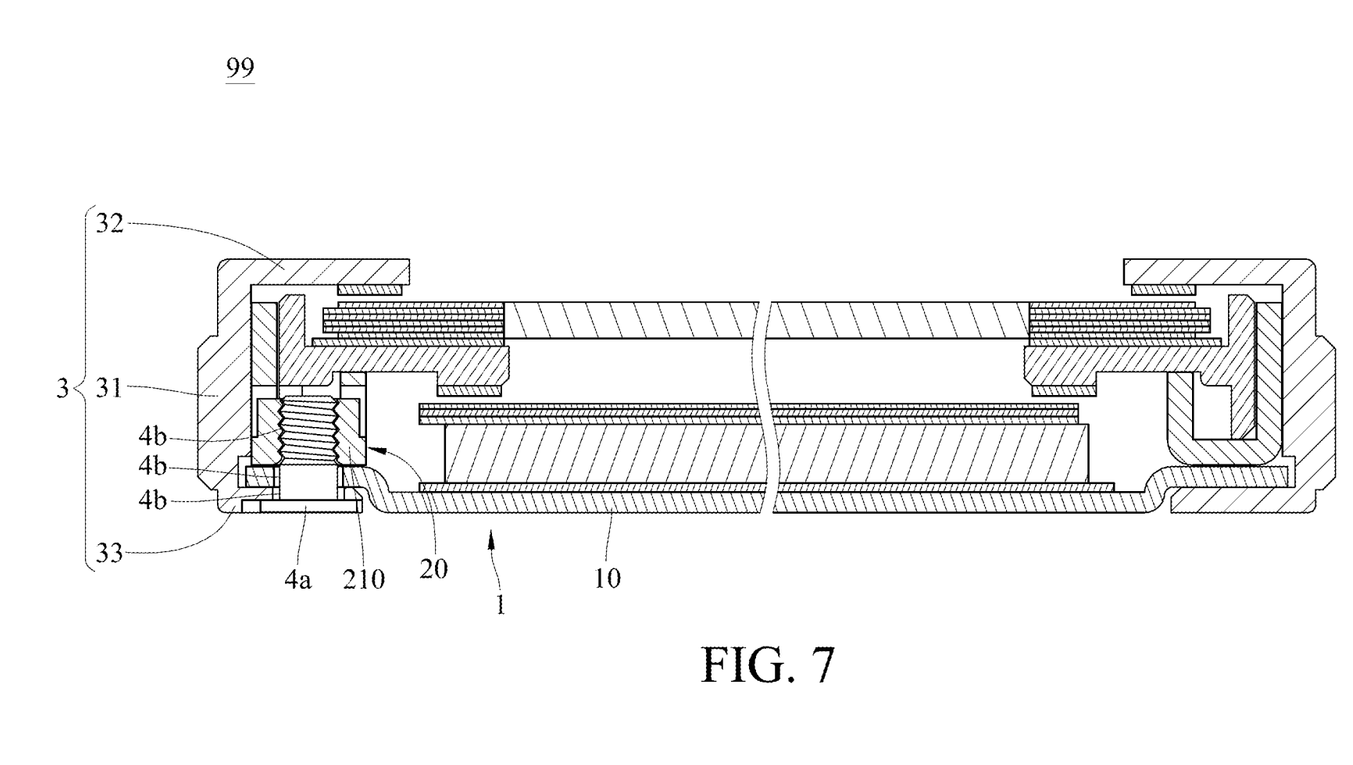
FIG. 7 is a cross-sectional view of the display device along a section line 7-7 in FIG. 1.

Please refer to FIG. 7, which is a cross-sectional view of the display device along a section line 7-7 in FIG. 1. In this embodiment, the display device 99 can further comprise a locking component 4a. Each of the bottom segment 33 of the bezel 3, the back board 10 and the base 210 of the supporting component 20 can have a locking hole 4b corresponding to the locking component 4a. In this embodiment, the locking component 4a may be a screw, and the inner wall of each locking hole 4b may be of screw thread. The bottom segment 33, the back board 10 and the base 210 are secured together by driving the locking component 4a into the locking holes 4b.

Summarizing above description, within the disclosed backlight module and display device, the base of the supporting component is disposed on the back board, and the first and second extending plates both stand on the base and extend along the axial direction of the base. Through the structure design of making the first and second extending plates line on the base, the supporting component may help to reinforce the structural strength at the edge of the backlight module, thereby preventing the display device from being deformed by external forces exerted.

Furthermore, the extending direction of the top segment and the bottom segment of the bezel is perpendicular to the extending direction of the first and second extending plates so that the bezel may further counteract external forces applied on the display device. Thus, the structure of the supporting component and the bezel have the effect of withstanding external forces along multiple axes, thereby facilitating overall structural strength of the display device.

What is claimed is:
1. A backlight module, comprising:
a back board;
an illumination assembly disposed on the back board, and the back board having an inner surface facing the illumination assembly;
a supporting component comprising a base, a first extending plate and a second extending plate, the supporting component and the back board being physically separate components but in contact with each other, the base being disposed on the inner surface of the back board, both of the first extending plate and the second extending plate standing on the base and extending along an axial direction of the base so that the first extending plate and the second extending plate are at a first angle and a second angle relative to the base, respectively, the first extending plate being located between the second extending plate and the illumination assembly, the base of the supporting component being in contact with the inner surface of the back board, and the base, the first extending plate and the second extending plate of the supporting component being integral with each other; and
a frame disposed on the supporting component, and the illumination assembly being located between the frame and the back board.

2. The backlight module according to claim 1, wherein a length, width or thickness of the first extending plate is different from a length, width or thickness of the second extending plate.

3. The backlight module according to claim 2, wherein the length of the first extending plate is less than the length of the second extending plate.

4. The backlight module according to claim 1, wherein the frame comprises a side wall and a bearing part extending from an edge of the side wall, the side wall is located between the first extending plate and the second extending plate, the bearing part is disposed on the first extending plate, the side wall comprises a hook, the supporting component has a fastening hole, and the hook is engaged with the fastening hole.

5. The backlight module according to claim 1, further comprising a positioning member, the illumination assembly comprising a light source and a light guide plate, the light source being disposed near a side of the light guide plate, the first extending plate withstanding against the positioning member, and the positioning member being located between the first extending plate and the light guide plate.

6. The backlight module according to claim 1, wherein the first extending plate of the supporting component has a top surface at a side away from the base, the first extending plate is recessed from the top surface to the base so as to form two recesses and a fixing portion located between the two recesses; the illumination assembly comprises a light source, a light guide plate and an optical film, the light guide plate has a light-exit surface and a light-entrance surface, the light source is disposed near the light-entrance surface, the optical film is disposed on the light-exit surface, the optical film has a fixing hole, and the fixing portion penetrates the fixing hole.

7. A display device, comprising:
the backlight module according to claim 1;
a display panel disposed on the frame of the backlight module and having an edge portion; and
a bezel disposed on the circumference of the backlight module, and the edge portion of the display panel being located between the frame and a part of the bezel.

8. The display device according to claim 7, wherein the bezel comprises a lateral segment, a top segment and a bottom segment, the top segment and the bottom segment are respectively connected to two opposing sides of the lateral segment; the second extending plate is located between the first extending plate and the lateral segment, the edge portion of the display panel is located between the frame and the top segment, the bottom segment is located on a side of the back board away from the supporting component.

9. The display device according to claim 8, wherein the first extending plate and the second extending plate both extend along a first extending direction, the top segment and the bottom segment both extend along a second extending direction that is perpendicular to the first extending direction.

10. The display device according to claim 8, further comprising a locking component, each of the bottom segment of the bezel, the back board and the base of the supporting component having a locking hole, and the locking component being locked into the locking holes so as to fix the bottom segment, the back board and the supporting component together.

* * * * *